United States Patent
Grunnet et al.

(10) Patent No.: US 10,815,971 B2
(45) Date of Patent: Oct. 27, 2020

(54) SYSTEM FOR MONITORING A WIND TURBINE BLADE

(71) Applicant: VESTAS WIND SYSTEMS A/S, Aarhus N (DK)

(72) Inventors: Jacob Deleuran Grunnet, Tranbjerg J (DK); Johnny Nielsen, Svenstrup J (DK); Jes Rasmussen, Galten (DK); Claus Thybo, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 294 days.

(21) Appl. No.: 15/844,273

(22) Filed: Dec. 15, 2017

(65) Prior Publication Data

US 2018/0171985 A1 Jun. 21, 2018

(30) Foreign Application Priority Data

Dec. 21, 2016 (DK) .................................. 201671016

(51) Int. Cl.
*F03D 7/04* (2006.01)
*F03D 17/00* (2016.01)
*F03D 1/06* (2006.01)
*G01S 17/89* (2020.01)

(52) U.S. Cl.
CPC ........... *F03D 17/00* (2016.05); *F03D 1/0675* (2013.01); *G01S 17/89* (2013.01); *F03D 7/045* (2013.01); *F05B 2240/221* (2013.01); *F05B 2240/912* (2013.01); *F05B 2270/804* (2013.01);
(Continued)

(58) Field of Classification Search
CPC ................ F03D 17/00; F05B 2270/804; F05B 2270/8042
See application file for complete search history.

(56) References Cited

U.S. PATENT DOCUMENTS 10,132,928 B2* 11/2018 Eldada .................... G01S 17/89
2012/0029892 A1 2/2012 Thulke
2013/0177417 A1 7/2013 Olesen
(Continued)

FOREIGN PATENT DOCUMENTS

EP 2300710 A2 3/2011
EP 2778395 A2 9/2014
(Continued)

OTHER PUBLICATIONS

Extended European Search Report for Application No. 17206581.5-1007 dated Apr. 25, 2018.
(Continued)

*Primary Examiner* — Eldon T Brockman
(74) *Attorney, Agent, or Firm* — Patterson + Sheridan, LLP

(57) ABSTRACT

The present disclosure relates to a system for determining at least one blade state parameter of a wind turbine blade, wherein the system is configured to: obtain blade data relating to the wind turbine blade from a sensor system associated with the wind turbine blade; compare at least one reference model of at least a portion of the wind turbine blade with the blade data; identify a reference model in dependence on the comparison; and determine at least one blade state parameter in dependence on the identified reference model. The blade data may take the form of an image, for example a 3-dimensional measurement such as a point cloud representing at least a portion of the blade.

16 Claims, 4 Drawing Sheets

(52) U.S. Cl.
CPC ....... *F05B 2270/8042* (2013.01); *Y02E 10/72* (2013.01); *Y02E 10/728* (2013.01)

(56) References Cited

U.S. PATENT DOCUMENTS

| | | |
|---|---|---|
| 2014/0054476 A1 | 2/2014 | Zheng et al. |
| 2014/0271181 A1* | 9/2014 | Perley ................... F03D 7/042 416/1 |
| 2015/0029053 A1 | 1/2015 | Dewberry et al. |
| 2015/0118047 A1 | 4/2015 | Yoon et al. |
| 2015/0252789 A1 | 9/2015 | Bunge |
| 2015/0293224 A1* | 10/2015 | Eldada ................. G01S 7/4814 250/206.1 |
| 2016/0084233 A1 | 3/2016 | Evans et al. |
| 2016/0237988 A1 | 8/2016 | Perley et al. |

FOREIGN PATENT DOCUMENTS

| | | |
|---|---|---|
| EP | 3056726 A1 | 8/2016 |
| WO | 2009/143849 A2 | 12/2009 |

OTHER PUBLICATIONS

Danish Patent and Trademark Office Search Report for Application No. PA 2016 71016, dated Jul. 6, 2017.

\* cited by examiner

SYSTEM FOR MONITORING A WIND TURBINE BLADE

TECHNICAL FIELD

The present disclosure relates to a system for determining at least one blade state parameter of a wind turbine blade, to a wind turbine including such a system, and to a method of determining at least one blade state parameter of a blade of a wind turbine.

BACKGROUND

Wind turbines are generally provided with a monitoring system for determining various in-use blade state parameters, such as blade deflection, blade twist, blade pitch angle, blade loading, blade vibration and rotational speed. Conventional blade monitoring systems typically include a large number of individual sensors such as strain sensors and accelerometers at various locations in each wind turbine blade. Each sensor is configured to measure a specific quantity at its specific location, and the monitoring system is configured to determine blade state parameters in dependence on data received from each of the sensors.

However, installing a large number of individual sensors in a wind turbine blade is time consuming and expensive, and it may not be possible to install sensors in all locations for which a reading may be desired. In addition, blade monitoring systems that rely on data from a large number of individual sensors may be impaired if one or more of the sensors stop functioning correctly, and sensors in certain locations may be difficult to repair or replace if damaged.

It is an aim of the present invention to address disadvantages associated with the prior art.

SUMMARY OF THE INVENTION

According to a first aspect of the present invention there is provided a system for determining at least one blade state parameter of a wind turbine blade, wherein the system is configured to:
obtain blade data relating to the wind turbine blade from a sensor system associated with the wind turbine blade;
compare at least one reference model of at least a portion of the wind turbine blade with the blade data;
identify a reference model in dependence on the comparison; and
determine at least one blade state parameter in dependence on the identified reference model.

The reference model may be a 3-dimensional model such as a CAD mesh model including the physical properties and structural dynamics of the blade from which it is possible to derive various blade state parameters.

The system of the present invention allows a large amount of data relating to a wind turbine blade to be extracted from the identified reference model. The system of the present invention may therefore reduce or eliminate the need to include a large number of individual sensors such as strain sensors and accelerometers in the wind turbine blade that are each configured to measure a specific quantity at their respective locations. However, it will be appreciated that the wind turbine blade may still be provided with additional sensors that may also be used in monitoring the state of the blade.

The blade state parameter(s) may be used in many different monitoring and control applications, for example in power optimisation, thrust control, blade load control, pitch control, ice detection, damage detection and monitoring of aero-elastic properties. The system of the present invention may be an imaging system, a monitoring system and/or a control system for monitoring and/or controlling operation of at least one blade of a wind turbine. The system may be configured to control operation of at least one wind turbine blade in dependence on the determined blade state parameter(s), or alternatively may be in communication with a separate control system that is configured to control operation of at least one wind turbine blade in dependence on the determined blade state parameter(s). For example, the system of the present invention may be configured to determine deflection and/or blade loading and to control the pitch angle of the blade in dependence on the determined deflection and/or blade loading.

The at least one blade state parameter may comprise at least one of: blade deflection, blade twist, blade pitch angle, blade loading, strain, blade vibration, rotational speed, blade velocity, and blade acceleration. The system may be configured to determine the one or more blade state parameters for one or more individual points on the blade, at one or more regions of the blade, and/or for the blade as a whole. The system may be configured to determine deflection rates, vibrations and accelerations for example by differentiating changes in deflection over time. The system may further be configured to estimate weather conditions in dependence on the identified reference model, for example by knowing or estimating blade response to different weather conditions.

The blade data may comprise an image of at least a portion of the wind turbine blade. Alternatively, or in addition, the blade data may comprise another type of sensor data, for example readings from one or more strain or load sensors provided in or on the wind turbine blade.

The image may be an image of at least a portion of the interior of the wind turbine blade. The image may include a significant portion of the blade, and optionally substantially the entirety of the blade. The image may include at least a portion of the front and/or rear skins of the blade and/or at least a portion of a box spar or one or more spars of the blade.

The image may be a 3-dimensional measurement. For example, the image may take the form of a 3-dimensional point cloud or point mesh of at least a portion of the wind turbine blade, which may be obtained using a 3-dimensional scanning device such as a LIDAR device. Alternatively the image may be a 2-dimensional image, for example an optical image including an array of data points representing a single scalar value such as greyscale.

The system may be configured to compare the reference model to the image by extracting a 3-dimensional point cloud or point mesh from the reference model, and comparing the 3-dimensional point cloud or point mesh extracted from the reference model with the image.

The system may be configured to identify the location and/or orientation of at least one feature of the wind turbine blade in the image, and to use the location and/or orientation of the at least one feature when comparing the at least one reference model with the image. The feature(s) may include natural features of the wind turbine blade (that is inherent features of the wind turbine blade that have not been added for the specific purpose of being identified by a monitoring system) and/or markers (that is devices such as reflective patches and strips of reflective tape that are added to the wind turbine blade specifically for the purpose of being identified by a monitoring system).

The system may be configured to compare the reference model with the blade data, and to control the reference model to reduce the error between the reference model and the blade data. The reference model may be controlled by varying one or more reference model parameters, for example by varying deflection and twist of the reference model. In this case the system may be configured to control the reference model in dependence on the error between the reference model and the blade data to minimise the error between the reference model and the blade data using an iterative process. When the reference model approximately corresponds to the blade data, the system may be configured to identify the version of the reference model corresponding to the blade data.

The system may be configured to compare a plurality of standard reference models with the blade data, and to identify a reference model from the plurality of standard reference models in dependence on the comparison. The plurality of standard reference models may correspond to a plurality of different deflection states of the blade. In this case the system may be configured to select the standard reference model that most closely corresponds to the blade data.

The step of identifying a reference model may comprise determining the error between one or more reference models and the blade data, and identifying a reference model having an error that is below an error threshold.

The system may further comprise an imaging device. The imaging device may be configured to generate either a 2-dimensional image of at least a portion of the wind turbine blade or a 3-dimensional measurement of at least a portion of the wind turbine blade. Alternatively, or in addition, the system may comprise another type of sensor system, for example including one or more strain or load sensors provided in or on the wind turbine blade. However, it will be appreciated that in some cases the imaging device or other sensor system may be supplied separately to the control module(s) forming the system of the present invention.

The imaging device may comprise a transmitter configured to emit a signal and a receiver configured to receive the reflected signal. The transmitter and the receiver may be located together within a common housing, or alternatively may be provided separately, and optionally at separate locations. The transmitter may optionally be configured to emit a pulsed signal.

The imaging device may be an electromagnetic radiation based imaging device. For example, the imaging device may be a visible light based imaging device. In some embodiments the emitter may be a laser light emitter. Alternatively the imaging device may operate using electromagnetic radiation at a different frequency, for example radio waves, microwaves, infrared light, ultraviolet light, X-rays or gamma rays. Alternatively the imaging device may be a sonar imaging device.

The imaging device may comprise a 3-dimensional scanning device. Alternatively the imaging device may comprise a camera configured to generate 2-dimensional images.

The imaging device may comprise a LIDAR scanning device, that is a Light Imaging Detection and Ranging scanning device.

The imaging device may comprise a micro-LIDAR scanning device, that is a small form factor LIDAR device, which may have a width and/or height of less than 100 mm or less than 60 mm.

The imaging device may comprise a solid state LIDAR device.

The imaging device may comprise a single chip LIDAR device.

The imaging device may be mounted to the wind turbine blade. Alternatively the imaging system may be mounted to a hub from which the blade extends.

The imaging device may be located inside the wind turbine blade.

The imaging device may be located within a root portion of the wind turbine blade and face towards a tip of the wind turbine blade.

A further aspect of the present invention provides a wind turbine provided with a system according to any preceding claim. The system may be configured to determine one or more blade state parameters for multiple blades of the wind turbine, and optionally further configured to control operation of the blades. The system may include one or more control modules configured to determine the blade state parameters, and optionally further to control the blades, which may be located in or near to the wind turbine, for example at the wind turbine base.

A further aspect of the present invention provides a system for determining at least one blade state parameter of a wind turbine blade, wherein the system is configured to determine at least one blade state parameter in dependence on a generated 3-dimensional measurement of at least a portion of the wind turbine blade. The system may include any of the features described above in connection with the first aspect of the present invention. In particular, the system may be configured to determine the at least one blade state parameter in dependence on a 3-dimensional measurement of at least a portion of the blade generated using a LIDAR scanning system.

A further aspect of the present invention provides a method of determining at least one blade state parameter of a blade of a wind turbine, the method comprising: obtaining blade data relating to the wind turbine blade from a sensor system associated with the wind turbine blade; comparing at least one reference model of at least a portion of the wind turbine blade with the blade data; identifying a reference model in dependence on the comparison; and determining at least one blade state parameter in dependence on the identified reference model. The method may further include any steps associated with the normal operation of the system or wind turbine described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
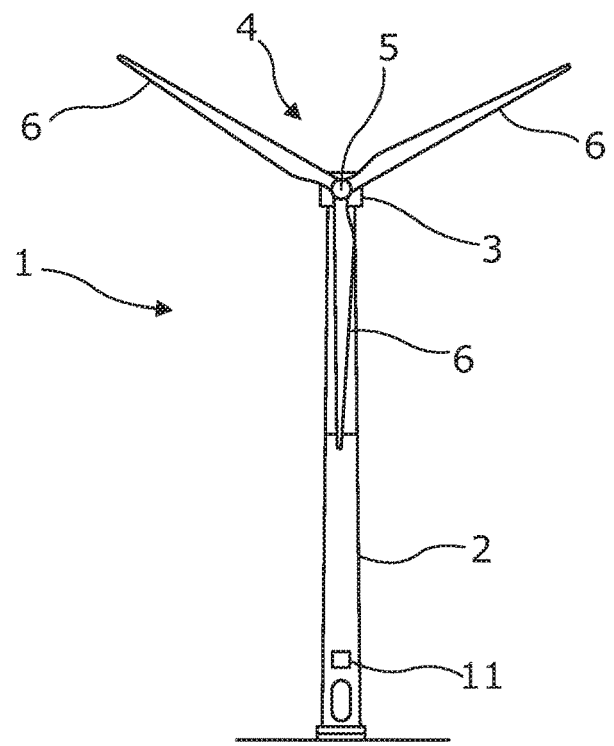
FIG. 1 schematically illustrates a wind turbine including a control system according to an embodiment of the present invention.
Figure 3:
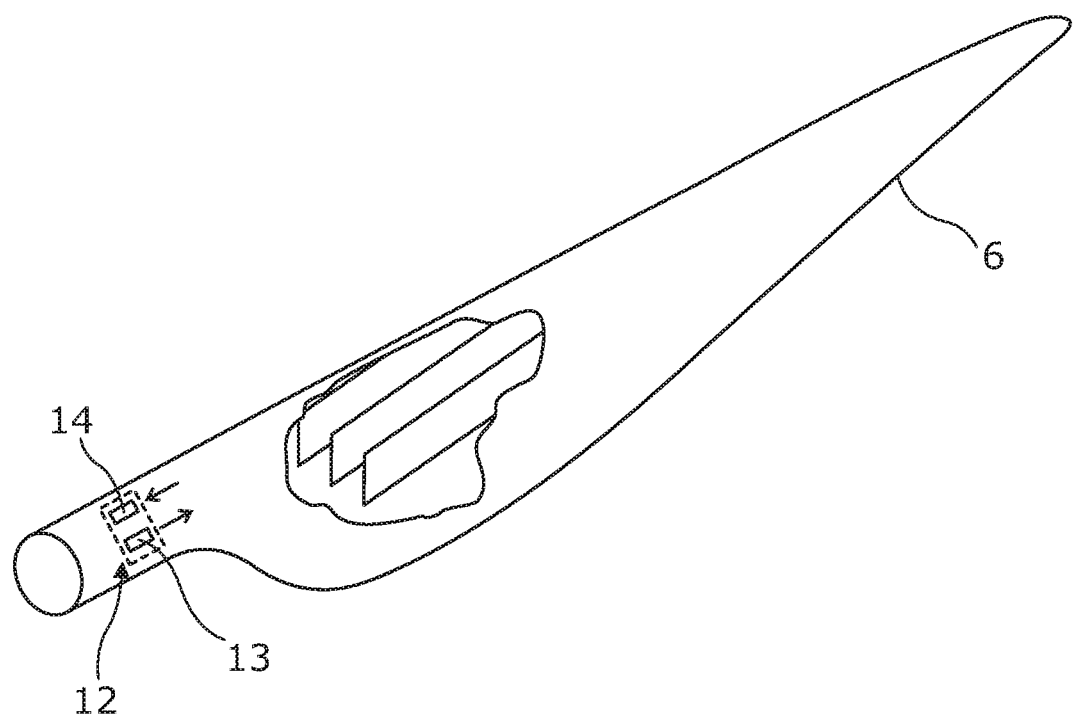
FIGS. 3 and 4 schematically illustrate a blade of the wind turbine including a LIDAR device.
Figure 4:
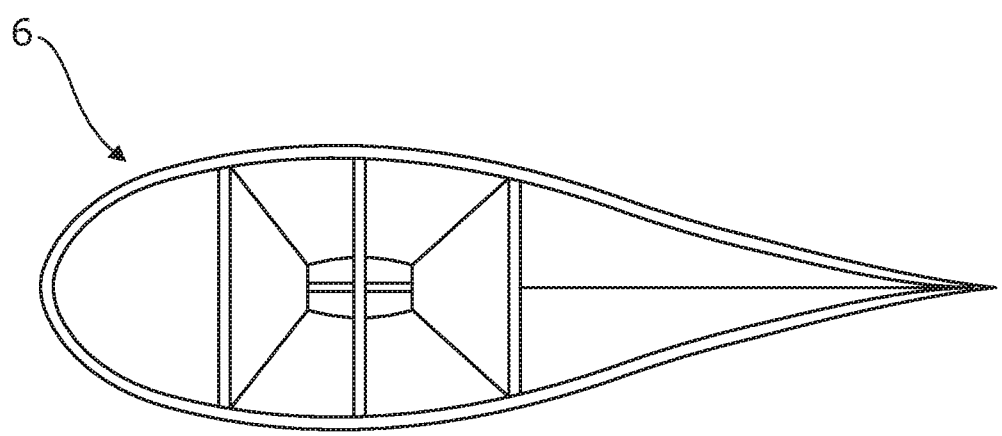

FIG. 1 schematically illustrates a wind turbine 1. The wind turbine may be either an on-shore wind turbine or an off-shore wind turbine. The wind turbine 1 comprises a tower 2 and a nacelle 3 mounted to the top of the tower 2. The nacelle 3 is provided with a rotor 4 mounted to an end face thereof, the rotor 4 comprising a central hub 5 and a plurality of blades 6 that extend outwardly from the hub 5. Each blade 6 comprises front and rear skins and a plurality of longitudinal spars or shear webs, as schematically illustrated in FIGS. 3 and 4. Each blade 6 includes a root portion or inboard portion via which it is attached to the hub 5, and a tip at its distal end furthest from the hub 5. The rotor 4 is connected via a drivetrain to an electrical generator housed within the nacelle 3.

Figure 2:
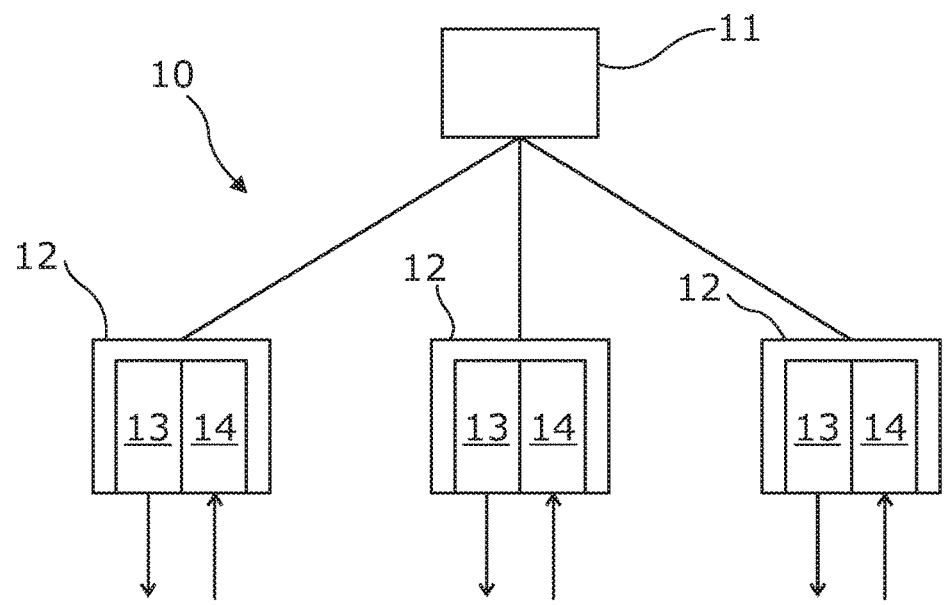
FIG. 2 schematically illustrates the control system of the wind turbine illustrated in FIG. 1.

The wind turbine 1 is provided with a control system 10 according to an embodiment of the present invention that is configured to monitor the blade state of each of the blades 6 and to control operation of the blades 6, as schematically illustrated in FIG. 2. The control system 10 comprises a control module 11 that is located at the base of the tower 2 of the wind turbine 1. The control system 10 further comprises a plurality of LIDAR scanning devices 12 that are in electronic communication with the control module 11 and configured to be controlled by the control module 11. The LIDAR devices 12 are each located within and mounted to the root portion of a respective one of the blades 6 and face outwardly towards the tips of the blades 6, as schematically illustrated in FIG. 3. A simplified version of the view along the interior of one of the blades 6 as seen from one of the LIDAR devices 12 is illustrated in FIG. 4. The LIDAR devices 12 may be, for example, single chip, solid state, micro-LIDAR devices, although other types of 3-dimension scanning devices may equally be employed in other embodiments of the present invention. Examples of suitable LIDAR devices include the "M8" and "S3" systems from Quanergy Systems, Inc.

Each of the LIDAR devices 12 includes a light emitting device 13 and a light receiving device or camera 14, which may be located together within a common housing, or alternatively in separate housings and optionally at separate locations. The light emitting devices 13 are configured to emit pulses of visible laser light into the interior of the blades 6 in a direction towards the tip, as schematically illustrated in FIG. 3. The light receiving devices 14 are configured to receive light from the light emitting devices 13 as reflected back towards the light receiving devices 14 within the blades 6.

Each of the LIDAR devices 12 is configured to generate images in the form of 3-dimension point cloud measurements of the visible portion of the interior surface of its respective blade 6 (as illustrated in FIG. 4) in dependence on the light reflected back towards the LIDAR device 12 and received at the light receiving device 14 during use of the wind turbine 1. As with a conventional LIDAR system, the 3-dimensional point cloud measurements are generated based on the time taken for reflected light to be received at the light receiving devices 14, and each comprise a large number of points each having a defined 3-dimensional location. The 3-dimensional point cloud measurements include portions of the front and rear skins of the blade 6 and portions of the longitudinal spars. The LIDAR devices 12 are configured to repeatedly generate 3-dimensional point cloud measurements, for example with a refresh rate of around 10 to 100 Hz or 50 to 100 Hz, although lower or higher frame rates would also be acceptable. The LIDAR devices 12 are further configured to communicate the 3-dimensional point cloud measurements to the control module 11 such that the control module 11 is continuously provided with 3-dimensional point cloud measurements representing the current shape of the interiors of each of the blades 6 substantially in real time during use of the wind turbine 1.

Monitoring and control of a single one of the blades 6 during use of the wind turbine 1 will now be described, although it will be appreciated that the control system 10 is configured to monitor and control each of the blades 6 in an equivalent manner.

Figure 5A:
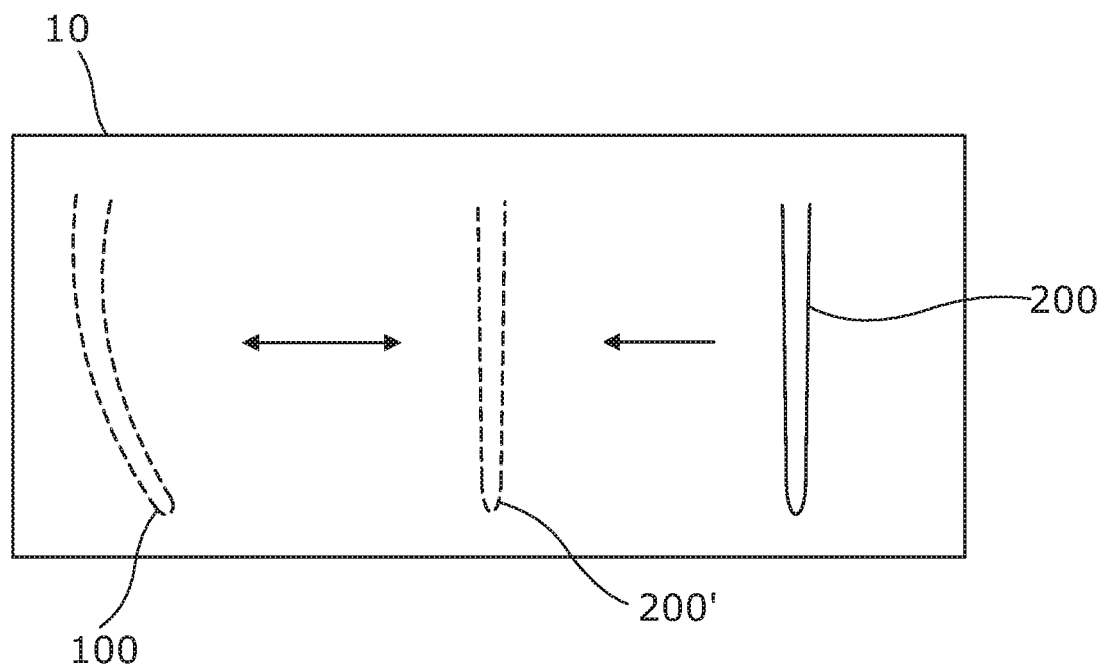
FIGS. 5*a* and 5*b* schematically illustrate a comparison between a 3-dimensional model of the wind turbine blade and a 3-dimensional point cloud measurement of the shape of the blade generated using the LIDAR device.
Figure 6:
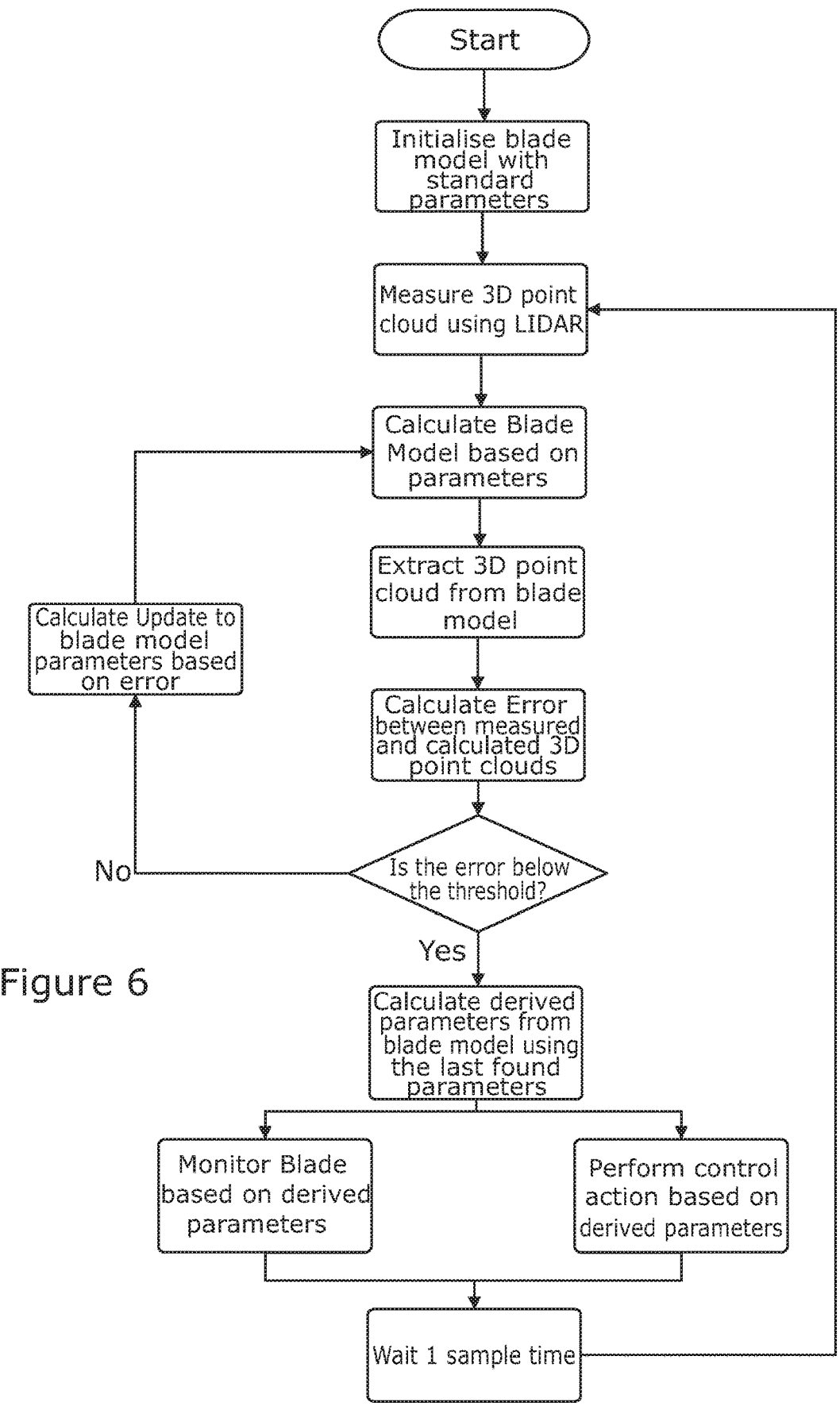
FIG. 6 illustrates a flow chart describing the steps used by the control system in determining blade state parameters.

The control module 11 stores a reference model 200 of the wind turbine blade 6, as schematically illustrated in FIG. 5*a*. The reference model 200 is a 3-dimensional CAD mesh model including the structural properties of the blade 6 having a shape or deflection state that is governed by variable model parameters including deflection and twist. The reference model 200 may be saved in the control model 11 before installation of the control module 11 in the wind turbine 1, or alternatively may be generated during a calibration period for the control module 11 after the control module 11 has been installed in the wind turbine 1. In an initial step, the control module 11 initialises the blade model 200 with standard parameters, as illustrated in the flow chart of FIG. 6. The LIDAR device 12 is then operated to generate a 3-dimensional point cloud measurement 100 of the shape of the interior its respective blade 6, as also schematically illustrated in FIG. 5*a* (in which the deflected shape of the blade 6 has been exaggerated to highlight the difference between the blade shape and the initial version of the blade model 200). The control module 11 then extracts a 3-dimensional point cloud 200' from the blade model 200 including the surface shape of at least a portion of the blade interior, and compares the point cloud 200' extracted from the blade model 200 with the point cloud measurement 100 of the blade 6, as schematically illustrated in FIG. 5*a*. The control module 11 then determines an error between the point cloud 200' extracted from the blade model 200 and the point cloud measurement 100 of the blade 6, and compares the error with threshold criteria. The control module 11 may be configured to evaluate the error based on a least-squares fit algorithm for a plurality of individual points on the point cloud 200' extracted from the blade model 200 and the point cloud measurement 100. The control module 11 may further be configured to use a feature recognition algorithm to identify particular blade features in the point cloud measurement 100 to be compared with corresponding portions of the point cloud 200' extracted from the blade model 200.

Figure 5B:
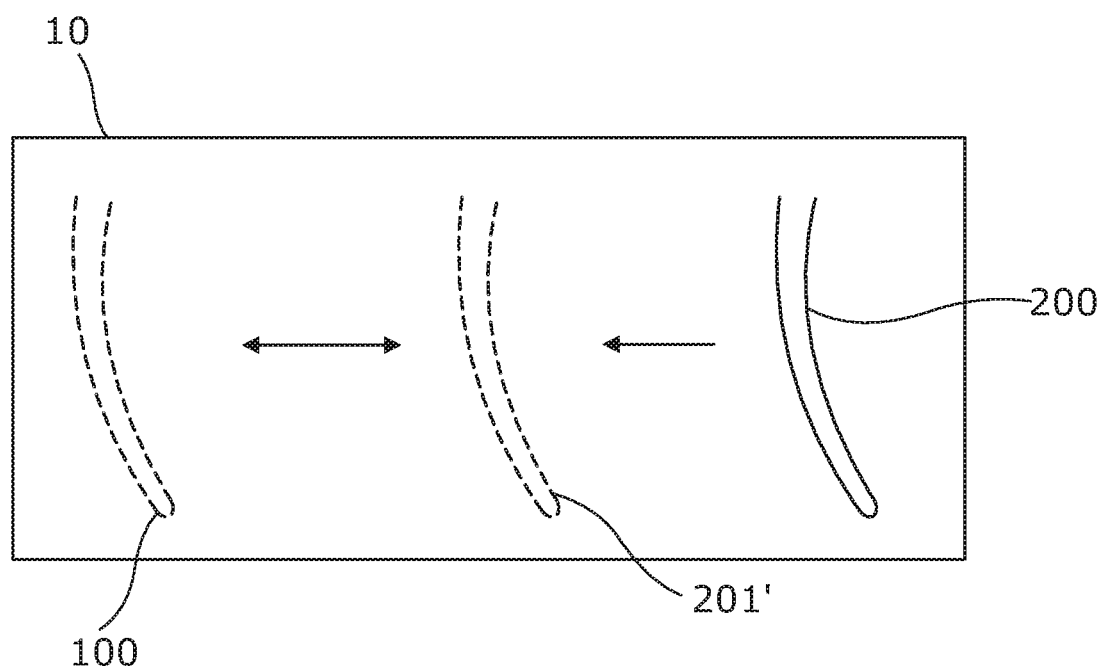

If the error between the point cloud 200' extracted from the blade model 200 and the point cloud measurement 100 of the blade 6 exceeds the threshold criteria, the control module 11 determines that the blade model 200 in its current form does not correspond to the point cloud measurement 100, and modifies one or more parameters of the blade model 200, for example deflection and/or twist, in dependence on the error in order to control, modify or adapt the blade model 200 to reduce the error between the blade model 200 and the point cloud measurement 100. The blade model 200 is then recalculated using the modified parameters to generate a second version of the blade model 200, as schematically illustrated in FIG. 5b. The control module 11 then extracts a further 3-dimensional point cloud 201' from the recalculated version of the blade model 200, and compares the point cloud 201' extracted from the recalculated blade model 200 with the point cloud measurement 100 of the blade 6, as schematically illustrated in FIG. 5a. The control module 11 then determines an error between the point cloud 201' extracted from the recalculated blade model 200 and the point cloud measurement 100 of the blade 6, and compares the error with the threshold criteria.

If the error between the point cloud 201' extracted from the recalculated blade model 200 and the point cloud measurement 100 of the blade 6 exceeds the threshold criteria, the control module 11 determines once again that the model 200 in its current form does not correspond to the point cloud measurement 100, and repeats the steps of modifying parameters of the blade model 200 to reduce the error between the blade model 200 and the point cloud measurement 100 in an iterative process.

However, when the error between the point cloud 201' extracted from the recalculated blade model 200 and the point cloud measurement 100 of the blade 6 falls within the threshold criteria, the control module 11 determines that the blade model 200 in its current form corresponds to the point cloud measurement 100, and identifies the current version of the reference model 200 as corresponding to the blade 6 in its current state. It can then be assumed that the input parameters used for the identified version of the reference model 200 (as modified to correspond to the current state of the blade 6) are correct, and so further blade state parameters can also be derived from the identified version of the reference model 200. The control module 11 is therefore able to analyse the identified version of the reference model 200 in order to derive various blade state parameters for the blade 6 substantially in real time, including one or more of: blade deflection, blade twist, blade pitch angle, blade loading, strain, blade vibration, rotational speed, blade velocity and blade acceleration.

Some blade state parameters such as blade deflection and blade twist may be derived directly from the geometry of the identified reference model 200. Blade loading may be determined in dependence on the loading required to achieve the deflected blade shape of the identified reference model 200. Blade deflection rates, vibrations and accelerations may be determined by differentiating changes in deflection over time. Rotational speed and/or azimuth angle of the blade 6 may be determined by recognising 1P deflection occurring as the direction of gravity acting on the blade changes during blade rotation and/or as the blade passes the tower. Weather conditions may also be estimated, for example by knowing or estimating blade response to different weather conditions.

The control module 11 is configured to repeat the above-described process at regular intervals in order to continuously monitor the state of the blade. Each monitoring cycle uses the most recently obtained point cloud measurement 100 in the comparison with the reference model 200. In the above-described monitoring cycle the first comparison is performed between an initial version of the reference model 200 (obtained using standard parameters) and the most recently obtained point cloud measurement 100. However, subsequent monitoring cycles may begin by comparing the most recently calculated reference model 200 from the previous monitoring cycle (based on updated parameters to match the shape of the blade 6) with the most recently obtained point cloud measurement 100 such that the first comparison is based on the last known blade state.

In addition to determining in-use blade state parameters for the blade 6, the control module 11 is further configured to control operation of the blade 6 in dependence on the determined blade state parameters. The determined blade state parameters may be used, for example, in power optimisation, thrust control, blade load control and/or pitch control. For example, the control module 11 may be configured to determine blade loading in the manner described above, and to control the pitch angle of the blades 6 in dependence on the determined blade loading in order to control blade loading and power generation.

The control module 11 may be configured to monitor each blade 6 individually, and to control operation of each blade 6 individually in dependence on blade state parameters determined for the respective blades 6. Alternatively, the control module 11 may be configured to monitor a single blade 6, and to control operation of each of the blades 6 in dependence on blade state parameters determined for the monitored blade 6.

Many modifications may be made to the above examples without departing from the scope of the present invention as defined in the accompanying claims.

For example, in the above-described embodiment the control system 10 is configured to compare successive iterations of a reference model 200 with a single 3-dimensional point cloud measurement 100 generated by a single LIDAR device 12 for each blade 6. However, in another embodiment the control system could equally include a plurality of separate LIDAR devices configured to generate 3-dimensional point cloud measurements of different portions of each blade. In this case the control system may be configured to compare successive iterations of the reference model with each of the 3-dimensional point cloud measurements generated for each blade, thereby allowing the comparison to be based on a larger portion of the blade than is possible using data from a single LIDAR device only.

In the above-described embodiment the control system 10 stores a single reference model 200 of a wind turbine blade and is configured to modify the reference model 200 until it approximately corresponds in shape to a 3-dimensional point cloud measurement 100 of the blade, and to identify the version of the reference model 200 that approximately corresponds in shape to the 3-dimensional point cloud measurement. However, in another embodiment the control system may instead store a plurality of standard reference models of the blade in various different deflection states. In this case the control system may be configured to compare the standard reference models to the 3-dimensional point cloud measurement and to select the standard reference model that most closely corresponds to the 3-dimensional point cloud measurement, from which blade state parameters may then be derived.

In the above-described embodiment the control system 10 is configured to obtain a 3-dimensional point cloud measurement of the interior of the blade 6, and to compare the reference model 200 with the 3-dimensional point cloud measurement of the interior of the blade 6 by extracting a 3-dimensional point cloud from the reference model and comparing the two 3-dimensional point clouds. However, in another embodiment the control system could equally be configured to obtain a 2-dimensional image of the interior of the blade from a 2-dimensional camera, and to compare the reference model with the 2-dimensional image by extracting a 2-dimensional image of the interior of the reference model as seen from the point of view of the camera and comparing the 2-dimensional image extracted from the reference model with the 2-dimensional image from the camera. In this case the control system may further be configured to control the reference model in dependence on the difference between the 2-dimensional images in order to reduce the error between the blade model and the 2-dimensional image of the interior of the blade. In other embodiments the control system could also be configured to use another type of sensor data in the comparison with the reference model. For example, the control system could be configured to obtain strain sensor data from a plurality of strain sensors provided in or on a blade, and to control the reference model in an iterative process until local strain readings derived from the reference model approximately match the strain readings generated by the strain sensors in order to obtain a model that approximately matched the current state of the blade. It will be appreciated that the control system could rely on an image of at least a portion of the blade in combination with other blade data such as strain sensor data, in which case the reference model may be controlled to match both the image and the strain sensor data.

In other embodiments the LIDAR devices 12 could equally be provided at different locations, for example in the hub 5 of the rotor 4 facing outwardly. In addition, the control module 11 could equally be located in the hub 5.

Other modifications will also be apparent to the skilled person.

The invention claimed is:

1. A system configured to:
generate a plurality of point models of a wind turbine blade at a corresponding plurality of different times;
compare a first point model of the plurality of point models with a subsequent point model of the plurality of point models to identify a blade state parameter based on changes in deflection rates of the wind turbine blade over the plurality of different times between generation of the first point model and the subsequent point model; and
control a pitch of the wind turbine blade based on the blade state parameter.

2. The system according to claim 1, wherein the blade state parameter comprises at least one of: blade deflection, blade twist, blade pitch angle, blade loading, strain, blade vibration, rotational speed, blade velocity, and blade acceleration.

3. The system according to claim 1, wherein the plurality of point models comprise 2-dimensional measurements of at least a portion of the wind turbine blade.

4. The system according to claim 3, wherein the system is configured to compare individual point models of the plurality of point models to identify associated reference models that include a point cloud or point mesh that matches an individual point model.

5. The system according to claim 4, wherein identifying a reference model comprises determining that an error between the reference model and the individual point model is below an error threshold.

6. The system according to claim 1, wherein the plurality of point models comprise an image of at least a portion of an interior of the wind turbine blade.

7. The system according to claim 1, wherein the plurality of point models comprise 3 dimensional measurements of at least a portion of the wind turbine blade.

8. The system according to claim 1, further comprising an imaging device configured to generate the plurality of point models.

9. The system according to claim 8, wherein the imaging device comprises a 3-dimensional scanning device.

10. The system according to claim 9, wherein the imaging device comprises a LIDAR scanning device.

11. The system according to claim 10, wherein the LIDAR scanning device is at least one of:
a micro-LIDAR device;
a solid state LIDAR device; and
a single chip LIDAR device.

12. The system according to claim 8, wherein the imaging device is mounted to the wind turbine blade.

13. The system according to claim 8, wherein the imaging device is located within a root portion of the wind turbine blade and faces towards a tip of the wind turbine blade.

14. A wind turbine, comprising
a tower;
a nacelle disposed on the tower;
a rotor having a first end disposed in the nacelle and a hub disposed on a second end;
a turbine blade connected to the hub; and
a control system disposed on the wind turbine, the control system comprising a sensor system disposed on the turbine blade, and further comprising a controller communicatively coupled to a light detecting device, wherein the control system is configured to perform an operation comprising:
generating, by the sensor system and the light detecting device, a plurality of point models of the turbine blade at a corresponding plurality of different times;
comparing a first point model of the plurality of point models with a subsequent point model of the plurality of point models to identify a blade state parameter based on changes in deflection rates of the turbine blade over the plurality of different times between generation of the first point model and the subsequent point model; and
controlling a pitch of the turbine blade based on the blade state parameter.

15. A system for controlling a pitch of a wind turbine blade based on at least one blade state parameter of the wind turbine blade, wherein the system is configured to determine the at least one blade state parameter based on a first generated 3-dimensional measurement of at least a portion of the wind turbine blade and a second generated 3-dimensional measurement of the portion of the wind turbine blade, generated at a subsequent time to the first generated 3-dimensional measurement, matching one or more change rate models of the wind turbine blade that each correspond to one of the at least one blade state parameters.

16. A method comprising:
generating a plurality of point models of an interior of a wind turbine blade at a corresponding plurality of different times;
comparing a first point model of the plurality of point models with a subsequent point model of the plurality of point models to identify a blade state parameter based on changes in deflection rates of the wind turbine blade over the plurality of different times between generation of the first point model and the subsequent point model; and
controlling the wind turbine blade based on the blade state parameter.

* * * * *